United States Patent [19]
Lange et al.

[11] Patent Number: 5,777,418
[45] Date of Patent: Jul. 7, 1998

[54] TRANSVERSE FLUX MOTOR WITH MAGNETIC FLOOR GAP

[75] Inventors: Andreas Lange, Heidenheim; Stefan Koll, Ulm, both of Germany

[73] Assignee: Voith Turbo GmbH, Heidenheim, Germany

[21] Appl. No.: 664,826

[22] Filed: Jun. 17, 1996

[30] Foreign Application Priority Data

Jun. 23, 1995 [DE] Germany .................. 195 22 382.9

[51] Int. Cl.$^6$ .................................................. H02K 1/12
[52] U.S. Cl. .................... 310/255; 310/163; 310/164; 310/254; 310/265; 310/266
[58] Field of Search .................... 310/266, 265, 310/254, 255, 163, 164

[56] References Cited

U.S. PATENT DOCUMENTS

| | | | |
|---|---|---|---|
| 5,051,641 | 9/1991 | Weh | 310/163 |
| 5,117,142 | 5/1992 | Von Zweygbergk | 310/156 |
| 5,233,252 | 8/1993 | Denk | 310/254 |
| 5,289,072 | 2/1994 | Lange | 310/266 |
| 5,345,133 | 9/1994 | Satake | 310/266 |
| 5,432,644 | 7/1995 | Tajima et al. | 369/90.04 |

FOREIGN PATENT DOCUMENTS

| | | |
|---|---|---|
| 35 36 538 | 4/1987 | Germany . |
| 43 14 513 | 11/1994 | Germany . |

OTHER PUBLICATIONS

English–languge abstract of DE 35 36 538 from Dialog® Derwent World Patent Index.

English–language abstract of DE 43 14 513 from Dialog® Derwent World Patent Index.

*Primary Examiner*—Steven L. Stephan
*Assistant Examiner*—Elvin G. Enad
*Attorney, Agent, or Firm*—Marshall, O'Toole, Gerstein, Murray & Borun

[57] ABSTRACT

A transverse flux motor includes an outer stator having a plurality of outer stator soft iron elements which are substantially disposed with uniform separation from one another. The flux motor further includes an inner stator having a plurality of inner stator soft iron elements. The inner stator further includes at least one anchor winding. The motor has a rotor which, looking at it in a section perpendicular to the axis, is built of alternating magnets and soft iron elements. The outer stator is free from anchor windings. Also, the outer stator soft iron elements are disposed in such a way that at least one gap region is provided which is larger than the space provided between the remaining neighboring stator soft iron elements. At least indirect means are provided in this region to compensate magnetic end effects.

13 Claims, 6 Drawing Sheets

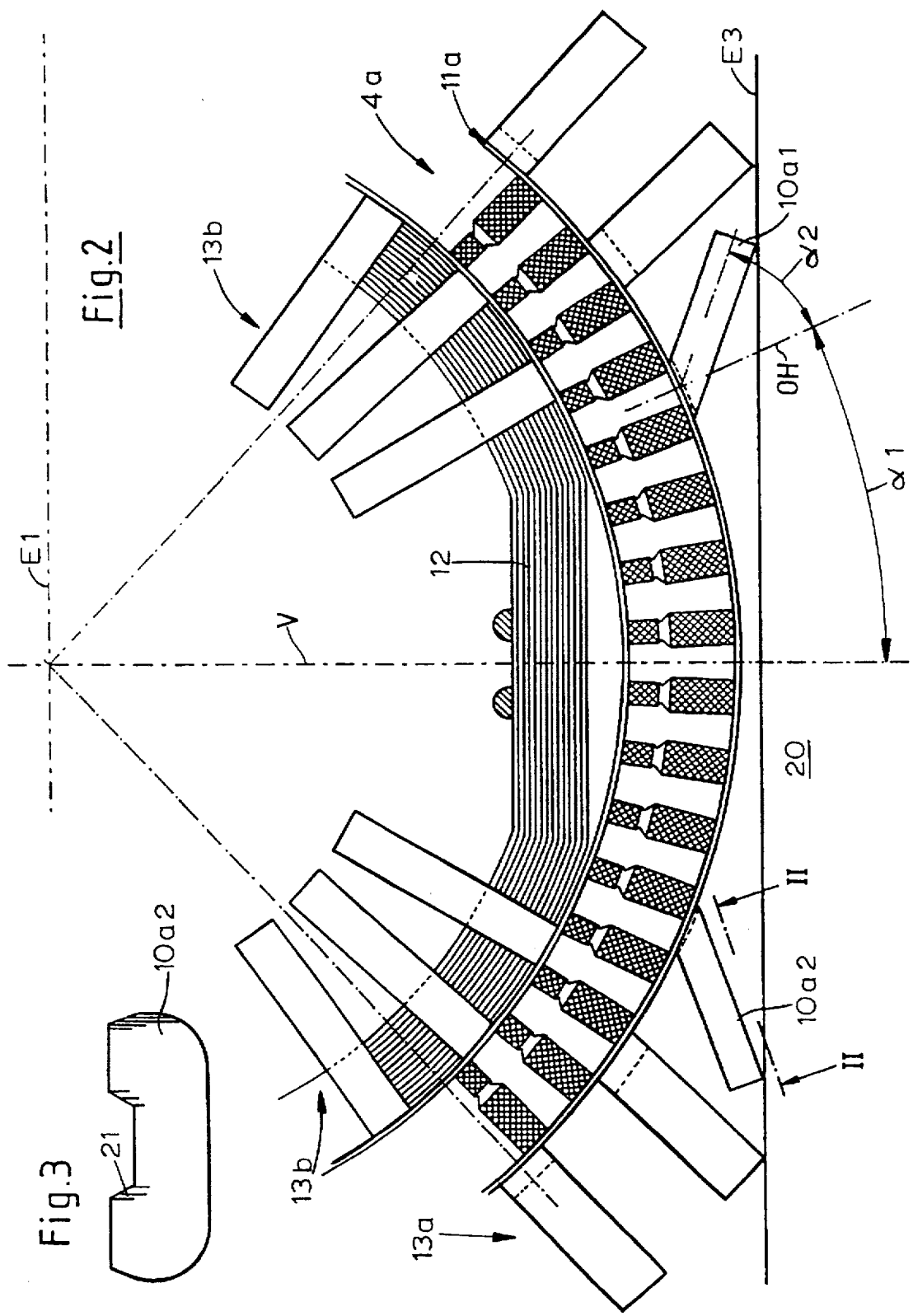

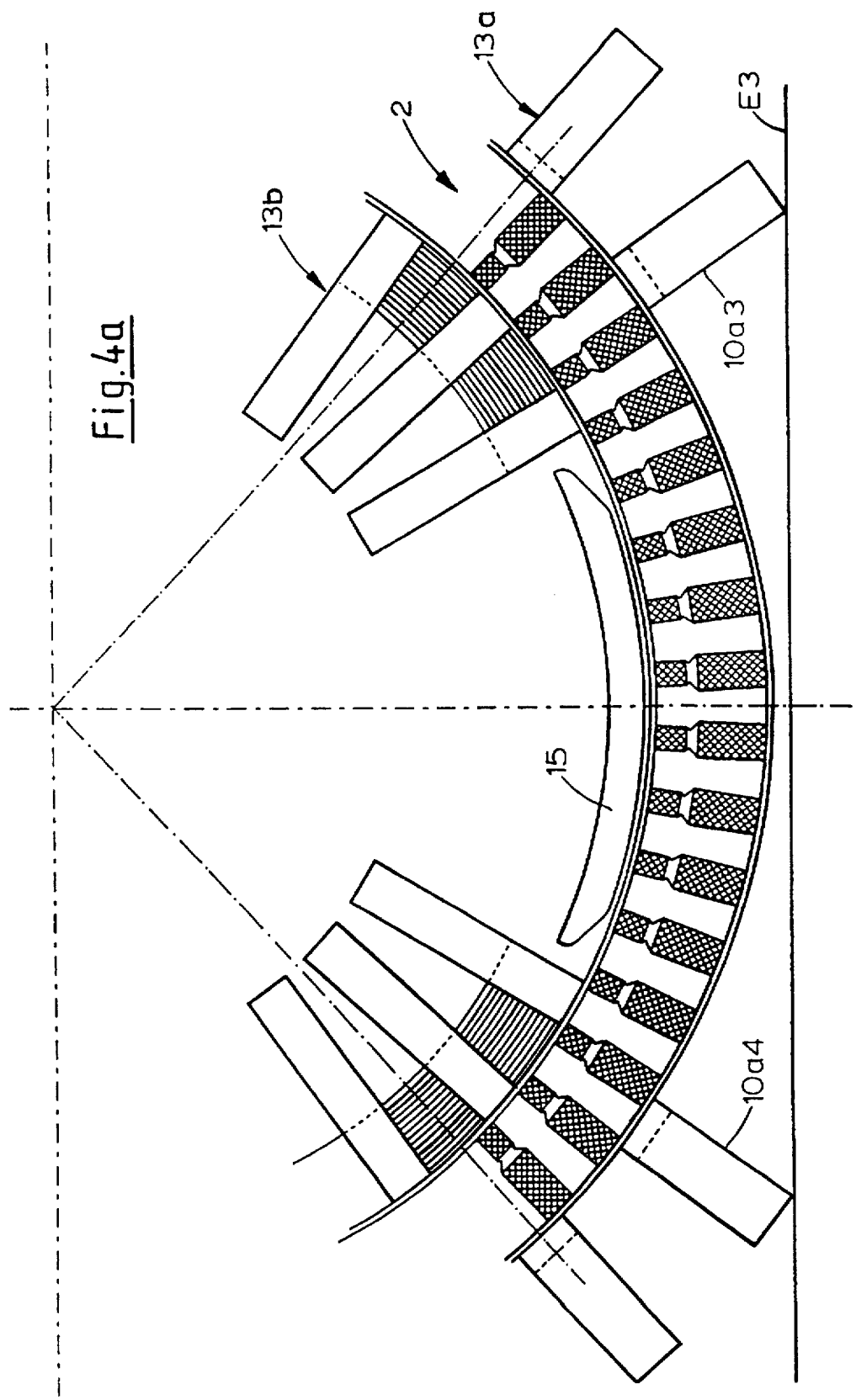

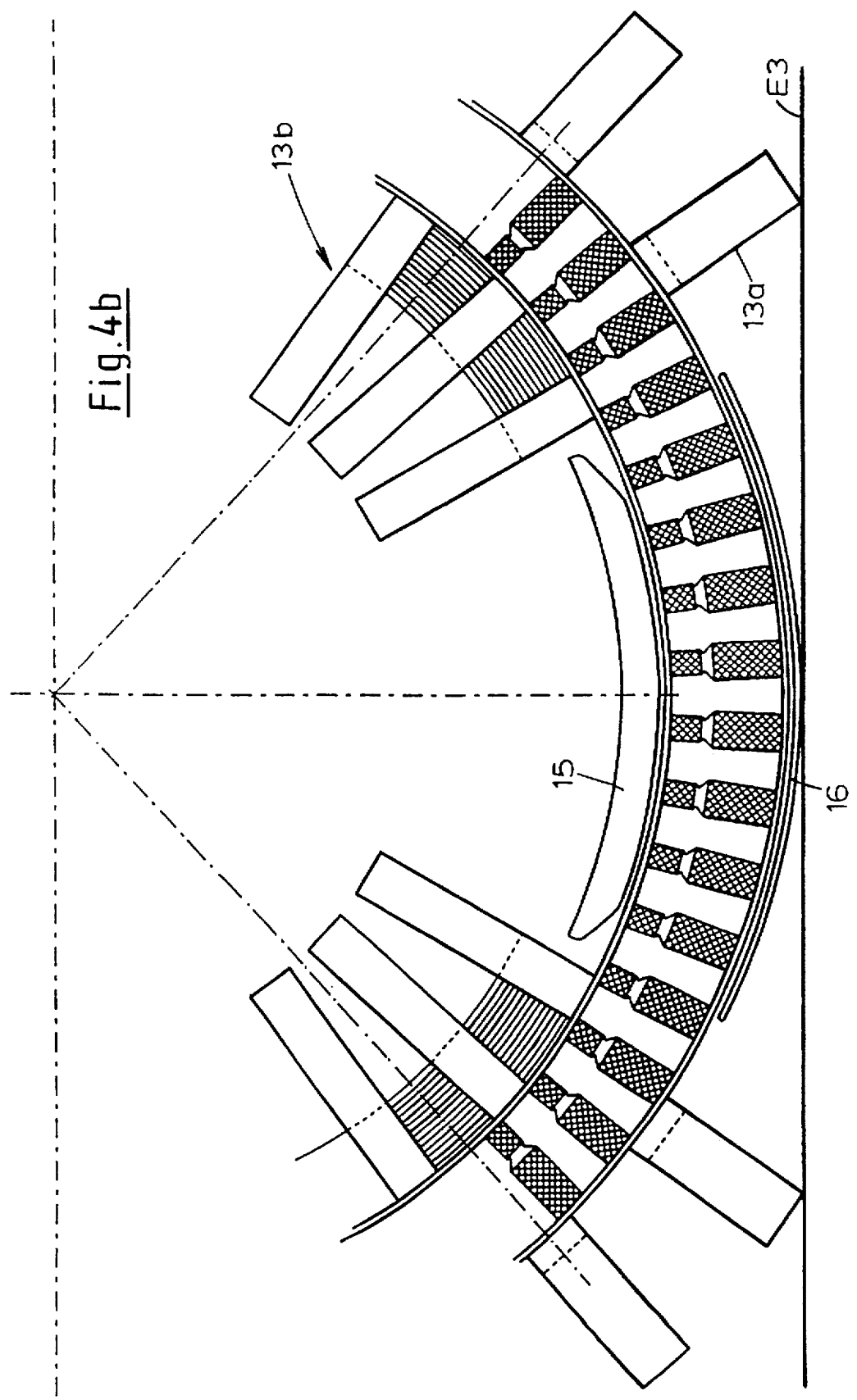

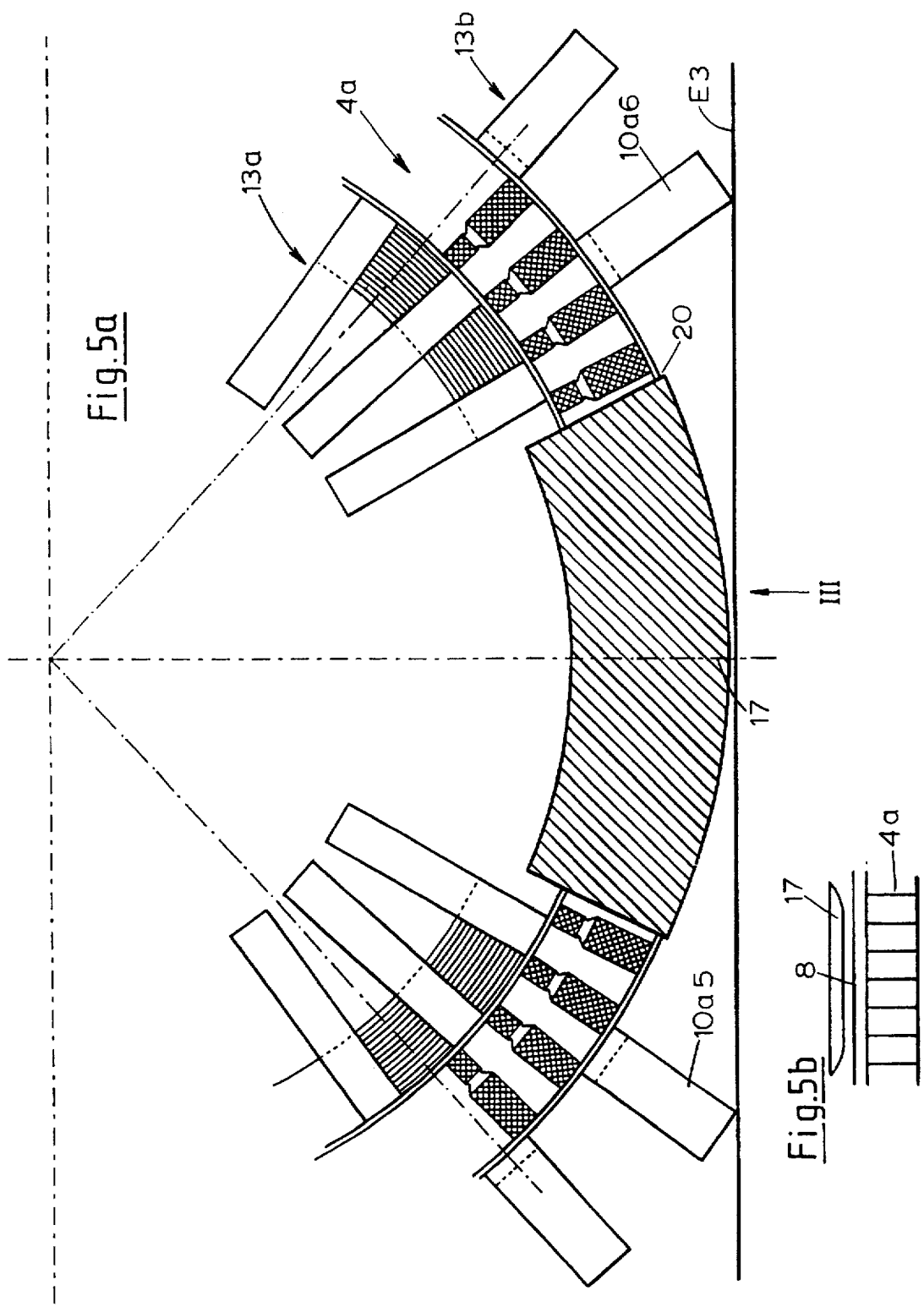

TRANSVERSE FLUX MOTOR WITH MAGNETIC FLOOR GAP

BACKGROUND OF THE INVENTION

1. Field of the Invention

The invention is concerned with a transverse flux motor for use in a vehicle direct drive, in particular for locomotive motors having an outer stator, an inner stator and a rotor.

2. Description of Related Technology

When traction motors are utilized as a direct drive, the permissible outside diameter of the motor is determined mainly by the room on a floor of the vehicle, i.e., by the available constructional space between an axle and wheel contact surface of the vehicle. An example of this is the direct drive of an axis in a locomotive. It is known that a great advantage can be achieved with regard to the transferrable power when it is possible to flatten the traction motor in the floor area. In the case of direct drives with induction motors, flattening involves a massive interference with the magnetic circuit. The reason for this is the spatial movement of the magnetic flux vector in a back region of the motor.

In asynchronous motors or series-characteristic motors, which are usually used as rail motors, the magnetic back area is flattened in such a way that the magnetic induction field of the motor is not perturbed in this area either. The enhanced thermal load in the flattened edge regions is compensated by suitable cooling measures, for example, by draft aeration with bores in the stator plate packet. However, the type of cooling of the motor does not reach the diameter of the motor when this flattening is limited due to strict electromagnetic requirements.

SUMMARY OF THE INVENTION

It is an object of the invention to overcome one or more of the problems described above. It is also an object of the invention to provide a direct drive in such a way that the above stated disadvantages are avoided and further providing effective utilization of the existing constructional space, thereby increasing transferrable power.

A transverse flux motor according to the invention includes an outer stator having a plurality of outer stator soft iron elements. The outer stator is free of anchor windings. The outer stator soft iron elements are disposed in such a way that at least two neighboring outer stator soft iron elements define a gap region therebetween. This gap region is larger than gaps defined between the remaining stator soft iron elements, which are disposed substantially uniformly with respect to one another. The motor also includes an inner stator having a plurality of inner stator soft iron elements, at least one anchor winding, and a rotor having alternating magnets and soft iron elements. Furthermore, the motor includes at least indirect means assigned to the gap region for compensation of magnetic end effects.

Other objects and advantages of the invention will be apparent to those skilled in the art from the following detailed description taken in conjunction with the drawings and the appended claims.

BRIEF DESCRIPTION OF THE DRAWINGS

FIG. 1b is partial cross-sectional view along I—I of FIG. 1a.

FIG. 2 is a partial sectional view of a transverse flux motor according to the invention shown in an axial direction and with a floor gap.

FIG. 3 is a sectional view taken along II—II of FIG. 2 showing a pole shoe according to the invention.

FIG. 4a is a partial sectional view of a second embodiment of a transverse flux motor according to the invention shown in an axial direction and with a floor gap.

FIG. 4b is a partial sectional view of a third embodiment of a transverse flux motor according to the invention shown in an axial direction and with a floor gap.

FIG. 5a is a partial sectional view of a fourth embodiment of a transverse flux motor according to the invention shown in an axial direction and with a floor gap.

FIG. 5b is a partial view of the embodiment shown in FIG. 5a at a location identified by the arrow III.

DETAILED DESCRIPTION OF THE INVENTION

Figure 1A:
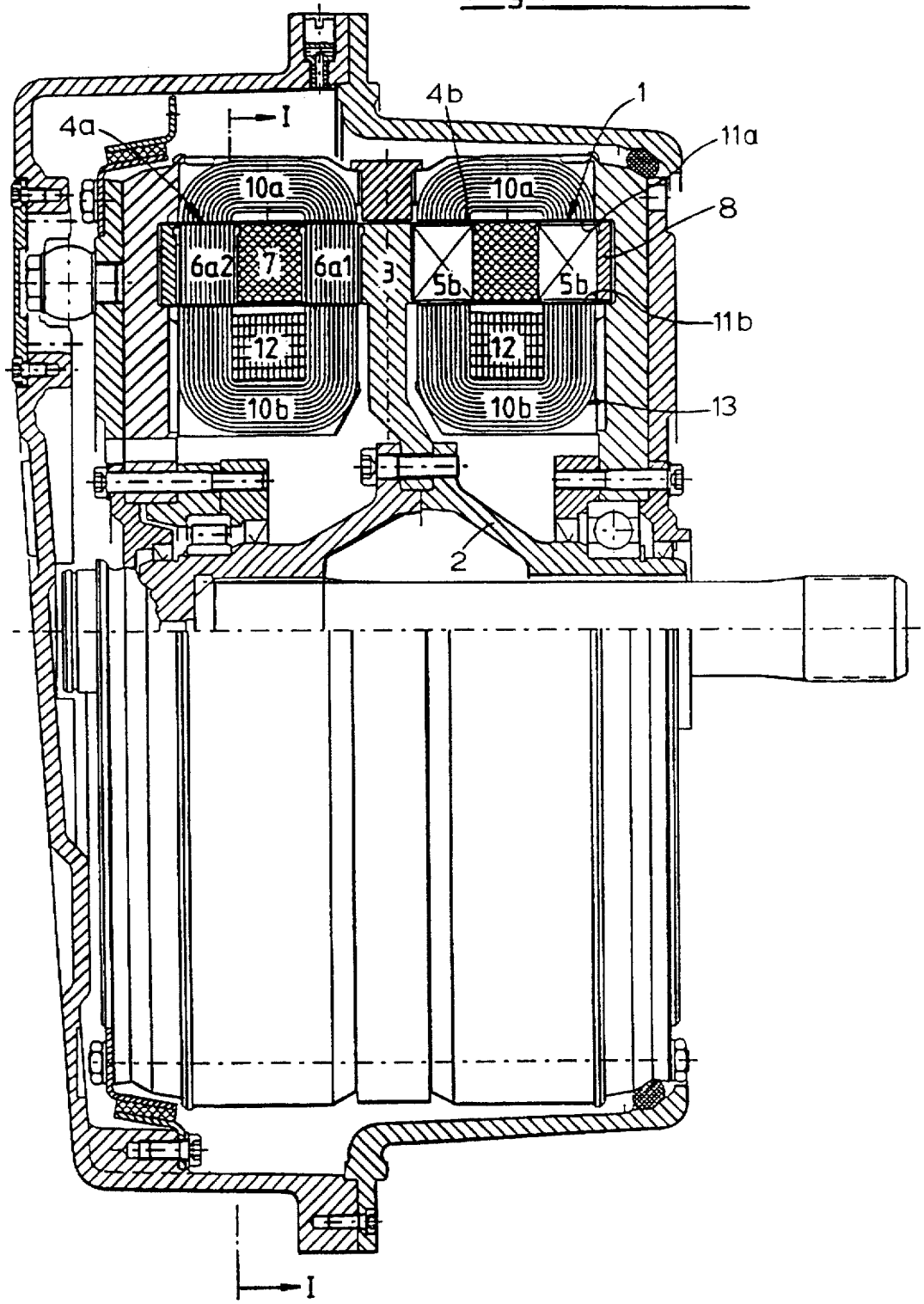
FIG. 1a is a longitudinal-sectional view of a transverse flux motor according to the prior art.

The inventors recognized that the use of a transverse flux motor for direct drive, for example, for the drive of a railway car makes flattening of the motor possible, with little expenditure, because of its nature, mainly the absence of a magnetic induction field to eliminate the related magnetic end effects. According to the invention, the flattening can be achieved by the following measures:

1. By disposing stator soft iron elements at essentially equal distances or equal distribution around an outer periphery of the rotor, taking into consideration the air gap due to the absence of stator soft iron elements or pole shoes at the outside diameter, the incorporation of the transverse flux motor in the flow region; and/or 2. Swinging out of the stator soft iron elements or pole shoes of the outside stator in the floor region from their axis orthogonal to the air gap between the stator and the rotor.

Based on these measures, an area is created with a larger intermediate space than that produced by the division between two neighboring stator soft iron elements. This space is called herein a magnetic floor gap. As known in the art, the rotor carries all the poles or pole structures and, correspondingly, the stator carries fewer, so that the intermediate space between two neighboring stator soft iron elements built in the floor region is significantly enlarged in comparison to the rest. As a result, the transverse flux motor can be built larger, since the outside diameter of the rotor can extend to a boundary region of a maximum permissible constructional space. The customary anchor winding on the outside stator is omitted, which results in a reduction of the thermal load. Furthermore, advantageously according to the invention, in the described region of the floor gap, there is no overlapping of the anchor and excitor fields, since the magnetic paths for this are not present because of the absence of the stator soft iron elements in the inner and outer stator. Thus it is possible in a simple way to realize the detection of the pole locus, namely, by measuring the rotor field, for example, with the aid of Hall probes. Thus, additional external elements, such as a resolver or an incremental transmitter can be omitted. This offers an enormous advantage in the use of hollow shaft motors which operate according to the transverse flux principle.

In addition to the absence of stator soft iron elements, the stator soft iron elements or pole shoes of the outside stator neighboring the gap can be swiveled away from the floor gap on their axis, which is orthogonal to the air gap. Thus, a favorable compromise can be realized between the size of the gap and the disturbing influence of it. The swiveled stator soft iron elements or pole shoes in the inlet region of the gap can be designed with a smaller width than the rotor, with just swiveling or additional swiveling. By chamfering at the flanks, the eddy current losses will be avoided upon penetration of the rotor field. Furthermore, means are provided according to the invention which compensate in a simple manner the magnetic end effect involving the floor gap.

In order to avoid the skin effect in the conductors of the windings, the anchor winding on the inner stator is preferably designed elbowed (i.e., offset) in the gap region and thus an increased distance of the conductor from the rotor is achieved.

To guide the rotor field, a flux guide piece is provided in the region of the gap. The flux guide piece can extend axially on both sides of the anchor winding of the inner stator, essentially over an area which corresponds to the extension angle in the peripheral direction of the region with the enlarged intermediate space on the outside stator. The flux guide piece can be produced from laminated transformer iron but also from a powder composite material. Besides providing a defined working point for the permanent magnet, it also serves for magnetic shielding against the surrounding structure.

Furthermore, there is a possibility to provide another flux guide piece in the form of a thin-walled screen disposed in the region of the gap at the outside diameter of the rotor. Such a flux guide piece may also be made of laminated transformer iron or from powder composite material. Such a flux guide piece provides the advantage that the penetration of the stray rotor field into the housing parts can be extensively avoided. Analogously, this also applies to the provision of an axial flux guidepiece next to the rotor in the axial direction at the height of the gap. Since usually the rotor or the pole body structures are limited in the axial direction because of the securing of an end ring, the axial flux guidepiece should be disposed next to the rotor or pole body structures at as small a distance therefrom as possible.

Figure 1B:
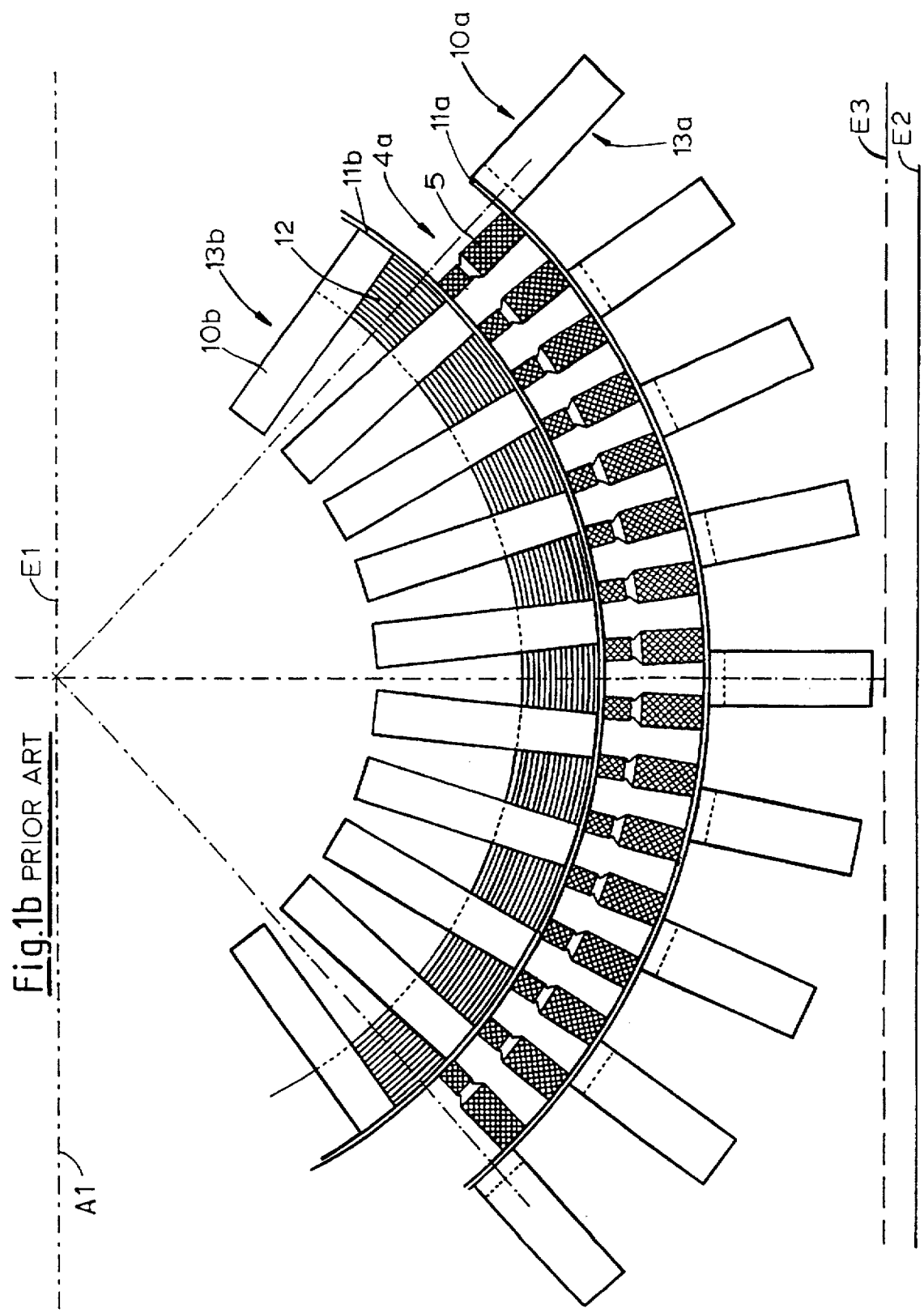

Embodiments according to the invention will now be explained with the aid of the drawing figures. Among others, these figures show the following: FIGS. 1a and 1b illustrate the problems that occur in direct drives using a conventionally designed transverse flux motor; FIG. 2 shows a floor gap according to the invention, in cross-section with an elbowed [offset] winding and swiveled outer stator soft iron elements; FIG. 3 shows an embodiment of a stator soft element that neighbors the gap; FIG. 4 shows a floor gap in cross-section with an additional flux guidepiece and a protective screen located on the outside thereof; FIG. 5 shows a floor gap in cross-section with an additional axial flux guidepiece.

FIGS. 1a and 1b show the basic structure of a conventionally designed transverse flux motor and the problems that occur when such a motor is used in a direct drive.

With respect to FIGS. 1a and 1b, a longitudinal section through a transverse flux motor is shown, in which, in a housing, a rotor 1 is disposed and rotatably mounted, with a rotor shaft 2 and a drive flange. In a central part of the motor shown in FIGS. 1a and 1b, the rotor shaft has a collar on which a circular central carrier disk 3 is secured. At the radial outside periphery of this carrier disk 3, ring-shaped or drum-shaped pole body structures extend on both sides in the axial direction, designated here as 4a and 4b. These pole body structures 4a and 4b each comprise permanent magnets 5 disposed in two rows and polarized alternately in a peripheral direction. For the pole body structure 4a there are magnets 5a and for the pole body structure 4b, there are magnets 5b. The pole body structures 4a and 4b also have soft iron elements. In FIGS. 1a and 1b, the soft iron elements are designated 6a1 and 6a2 for the pole body structure 4a and designated 6b1 and 6b2 for the pole body structure 4b (but this is not shown). In the axial direction, each pole body structure 4a and 4b is built as follows: starting from the carrier disk 3 there is disposed a first row of extending permanent magnets 5 or soft iron elements 6, followed by an intermediate ring 7, followed by a second row of permanent magnets 5 or soft iron elements 6, then followed by an end ring 8.

An inner stator 13b and an outer stator 13a are provided radially within and outside the pole body structures 4a and 4b. Each of stators 13a and 13b comprise a plurality of stator soft iron elements 10 on the stator housing assigned to the pole body structures and disposed in a peripheral direction. The soft iron elements which are disposed radially outside the pole body structures are designated 10a, and the stator soft iron elements that are disposed radially inside the pole body structures are designated 10b. The individual stator soft iron elements are arranged in such a way that radial air gaps 11 (shown as 11a and 11b in FIG. 1b) are formed to pole body structures 4a and 4b. Here, again, the air gaps disposed radially inside the pole body structures are designated 11b and the air gaps disposed radially outside the pole body structures are designated 11a. The stator soft iron elements 10b and 10a are distributed along the entire periphery of the structures and windings 12 go through the elements 10b. The iron elements 10b and the windings 12 form a stator, generally 13 of the motor disposed in a stator housing in a fixed manner.

FIG. 1b shows a partial section I—I through the conventional transverse flux motor shown in FIG. 1a. For reasons of simplification, the anchor winding is not completely shown. FIG. 1b illustrates the problem of the use of a transverse flux motor in a direct drive. The limits are determined by the distance between a plane E1, which can be described by the axis A1, which generally corresponds to the drive axis and a horizontal, and a plane E3, the position of which can be determined by consideration of the possible vibrations that occur with respect to a plane E2, which corresponds to a vehicle wheel contact surface. The distance between the plane E1 and the plane E3 in the vertical direction delimits the size of the transverse flux motor to be used. The distance between the plane E1 and the plane E3 forms a region which permits the incorporation of a transverse flux motor in a direct drive without the outside periphery of the transverse flux motor touching the floor in the case of shaking or similar motion. It can be seen from FIG. 1b that both the size of the stator and the rotor must therefore be taken into consideration. Thus, the design of a transverse flux motor can only be done with respect to its outside dimension, as a result of which its use is limited with regard to the boundary condition "size," also limiting performance.

FIGS. 2, 4a and 4b show a design of a transverse flux motor according to the invention in a partial section through a transverse flux motor in the axial direction. The transverse flux motors of FIGS. 2, 4a and 4b include a so-called floor gap. The basic structure of the transverse flux motor corresponds to that of the conventional transverse flux motor discussed herein with respect to FIGS. 1a and 1b. Therefore, the same reference numbers will be used for elements of transverse flux motors according to the invention which are similar in structure and function to the elements disclosed and discussed with respect to FIGS. 1a and 1b.

The partial section shown in FIG. 2 is in the built-in position of the transverse flux motor, whereby the plane E1 represents the plane in which the drive shaft is disposed. In a known manner, the rotor carries all the poles and pole body structures 4a and 4b as shown in FIG. 1a. However, only pole body structures 4a are shown in FIG. 2. Otherwise, the structure is unchanged. According to the invention, the transverse flux motor is flattened near a floor thereof, looking at it in the built-in position. For this purpose, the stator soft iron elements disposed on the outer stator 13a in the radial direction outside the pole body structure 4a are omitted. In other words, the stator soft iron elements are arranged in such a way that, on the outer stator 13a, the stator soft iron elements define a gap region 20 which is an intermediate space produced between two neighboring stator soft iron elements. With reference to FIG. 2, stator soft iron elements 10a1 and 10a2 define the gap region 20 which is larger than the gaps formed between the remaining soft iron elements.

Furthermore, the outer stator 13a is free from anchor windings. Thus, in the floor region, the outer stator has an interruption which is effective with regard to its magnetic properties; this interruption extending on both sides against a vertical V in the built-in position, for example, when looked at an angle α1. In the region 20, then, there is no overlapping of anchor field and excitor field, since the magnetic paths are lacking for this. This provides the advantage that, in comparison to the use of a conventional transverse flux motor, the constructional space available, which corresponds to the distance between the two planes E1 and E3, can be utilized almost completely for the rotor. As a result, a larger transverse flux motor can be constructed in the same space and such a motor can have higher performance.

However, in addition to the floor gap according to the invention, FIG. 2 shows a number of other advantageous possible embodiments. Thus, for example, it is possible to swivel the soft stator elements 10a1 and 10a2, which are in the neighborhood of the floor gap, that is, the pole shoes of the outer stator 13a, from their axis OH, which is orthogonal to the air gap 11a, by an angle α2. In the case shown, these are the stator soft iron elements or pole shoes of the outer stator 10a1 and 10a2. This offers the advantage of reduced floor gap while providing the same freedom on the floor.

The pole shoes 10a1 and 10a2 can also be designed with a smaller iron width than that of the rotor. By corresponding chamfering at the flanks, the eddy current losses upon penetration of the rotor field are avoided. An embodiment of such a pole shoe design is shown in FIG. 3 as seen at II—II of FIG. 2 (not to scale). The stator soft iron element 10a2 has slanted edges 21.

In order to avoid the skin effect in the conductors as a result of the rotor field, the anchor winding in the gap region can be elbowed (i.e., offset) with respect to the inner stator 13b. Thus, a larger distance between conductors is achieved, that is, between the individual components of the anchor winding from the rotor 1, and the influence of the anchor winding by the rotor 1 is reduced.

FIG. 4a shows an embodiment of an apparatus according to the invention which provides the possibility of guiding the rotor field, by arranging a flux guide piece 15 on the inner stator 13b in the region of the gap to guide the rotor field. The guide piece 15 can be made, for example, from laminated transformer iron or from a powder composite material. The flux guide piece 15 is substantially disposed in the region of the outside periphery of the inner stator 13b. The windings are guided normally. The windings that can be elbowed (offset) on the inner stator 13b in the region where the gap 20 extends are not shown for the sake of clarity. In addition, as shown in an embodiment of an apparatus according to the invention at FIG. 4b, in order to prevent the penetration of the rotor stray field into the housing part in the region of the inner diameter of the outer stator 13a in the region of the floor gap, a thin-walled screen 16 of similar materials can be inserted.

The embodiments shown in FIGS. 3 and 4 can also be used for the apparatus shown in FIG. 2.

FIGS. 5a and 5b schematically illustrate the use of an axial flux guidepiece 17 in an apparatus according to the invention. The basic structure of the rotor 1 and the stator 13 corresponds to that shown and described with respect to FIGS. 1, 2 and 4 herein. Therefore, the same reference numbers used in FIGS. 1, 2, and 4 are used for the same elements in FIGS. 5a and 5b. With respect to FIG. 5a, in the axial direction, next to the rotor 1, a flux guidepiece 17 is disposed radially at a height of the gap or the enlarged intermediate space 20, between two neighboring stator soft iron elements, here stator soft iron elements 10a5 and 10a6.

In a view III corresponding to FIG. 5a, there is shown a top view of a pole structure 4 of the rotor 1 of a transverse flux motor. It can be seen from this view that the axial guidepiece that is intended to provide this intended function may be arranged only at a very small distance next to an end ring 8 assigned to the pole structure 4.

The foregoing detailed description is given for clearness of understanding only, and no unnecessary limitations should be understood therefrom, as modifications within the scope of the invention will be apparent to those skilled in the art.

We claim:

1. A transverse flux motor comprising:
   a) an outer stator further comprising a plurality of outer stator soft iron elements, the outer stator being void of any anchor windings, the outer stator soft iron elements being disposed in such a way that at least two neighboring outer stator soft iron elements define a gap region therebetween, said gap region being larger than gaps defined between the remaining said stator soft iron elements, other than said two neighboring elements, being disposed substantially uniformly with respect to one another;
   b) an inner stator having a plurality of inner stator soft iron elements and at least one anchor winding;
   c) a rotor further comprising alternating magnets and soft iron elements; and
   d) means assigned to the gap region for compensation of magnetic end effects.

2. The transverse flux motor of claim 1 wherein the at least two neighboring outer stator soft iron elements are each disposed at an angle with respect to an axis orthogonal to an air gap formed between the rotor and the respective outer stator element.

3. The transverse flux motor of claim 2 wherein the at least two neighboring outer stator soft iron elements each have a thickness that is smaller than a thickness of the remaining outer stator soft iron elements.

4. The transverse flux motor of claim 1 wherein the gap region is produced by the absence of at least one outer stator soft iron element.

5. The transverse flux motor of claim 4 wherein the at least two neighboring outer stator soft iron elements are each disposed at an angle with respect to an axis orthogonal to an air gap formed between the rotor and the respective outer stator element.

6. The transverse flux motor of claim 4 wherein the at least two neighboring outer stator soft iron elements each have a thickness that is smaller than a thickness of the remaining outer stator soft iron elements.

7. The transverse flux motor of claim 1 wherein the anchor winding of the inner stator is designed in an elbow (offset) manner at least in a part of a region defined by an extension angle on the inner stator corresponding to the gap region in the peripheral direction of the outer stator.

8. The transverse flux motor of claim 1 wherein at least one flux guidepiece is assigned to the gap region.

9. The transverse flux motor of claim 8 wherein the flux guidepiece is disposed between the anchor winding of the inner stator and the rotor.

10. The transverse flux motor of claim 8 wherein the flux guidepiece is disposed adjacent the rotor in an axial direction therefrom.

11. The transverse flux motor of claim 8 wherein a screen is disposed in the gap region in a radial direction and on an outside periphery of the rotor.

12. The transverse flux motor of claim 8 wherein the flux guidepiece is made of laminated transformer iron.

13. The transverse flux motor of claim 8 wherein the flux guidepiece is made of a powder composite material.

* * * * *